United States Patent
Schindler et al.

(10) Patent No.: US 8,694,806 B2
(45) Date of Patent: Apr. 8, 2014

(54) POWER TRANSFER IN AN INLINE SWITCH DEVICE

(75) Inventors: Frederick R. Schindler, Sunnyvale, CA (US); Yu Liu, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 13/190,860

(22) Filed: Jul. 26, 2011

(65) Prior Publication Data

US 2013/0031378 A1    Jan. 31, 2013

(51) Int. Cl.
*G06F 1/00* (2006.01)
*H02J 3/14* (2006.01)
*G05D 3/12* (2006.01)
*G01R 19/00* (2006.01)

(52) U.S. Cl.
USPC ............. 713/300; 307/31; 700/291; 700/295; 700/297; 702/64

(58) Field of Classification Search
USPC ............. 713/300; 307/31; 700/291, 295, 297; 702/64
See application file for complete search history.

(56) References Cited

U.S. PATENT DOCUMENTS

| | | | | |
|---|---|---|---|---|
| 7,417,443 | B2* | 8/2008 | Admon et al. | 324/713 |
| 7,664,136 | B2* | 2/2010 | Toebes et al. | 370/463 |
| 7,921,307 | B2 | 4/2011 | Karam et al. | |
| 7,921,314 | B2 | 4/2011 | Schindler et al. | |
| 7,930,568 | B2 | 4/2011 | Schindler | |
| 2006/0168459 | A1* | 7/2006 | Dwelley et al. | 713/300 |
| 2006/0209875 | A1* | 9/2006 | Lum et al. | 370/445 |
| 2012/0317426 | A1* | 12/2012 | Hunter et al. | 713/300 |

* cited by examiner

*Primary Examiner* — Stefan Stoynov
(74) *Attorney, Agent, or Firm* — Edell, Shapiro & Finnan, LLC

(57) ABSTRACT

An apparatus and method for transferring power in an inline switch device are provided. The method comprises drawing power from an inline power source and transferring, by the powered device subsystem, a portion of the power that is not consumed by the powered device subsystem to one or more connected powered devices. The method further comprises determining a limit of current drawn by the powered device subsystem during transfer of power by the powered device subsystem to the one or more powered devices that results in the transfer of a desired amount of power to the one or more powered devices, and adjusting the limit for the current drawn by the powered device subsystem to the determined current limit.

35 Claims, 10 Drawing Sheets

POWER TRANSFER IN AN INLINE SWITCH DEVICE

TECHNICAL FIELD

The present disclosure relates to inline power applications.

BACKGROUND

Power over Ethernet (PoE) is an inline power technology that uses an Ethernet networking cable to deliver power to network devices that have Ethernet connectivity. In PoE technology, a device may be a powered device (PD) or an inline power source, sometimes referred to as power sourcing equipment (PSE). An inline power source is a device, such as an Ethernet switch, that provides or sources power to other devices through an Ethernet cable. A PD is a network device, such as a wireless access point, internet phone, etc., that is powered by the inline power source through an Ethernet cable.

In certain circumstances, a PD may be a network device that draws power from an inline power source, but that also provides power to one or more additional downlink PDs. Such network devices that both draw and source power are sometimes referred to as PD-PSE devices.

DESCRIPTION OF EXAMPLE EMBODIMENTS

Overview

An apparatus and method for transferring power in an inline switch device are provided. The method comprises drawing power from an inline power source and transferring, by a powered device subsystem in the inline switch device, a portion of the power that is not consumed by the powered device subsystem to one or more powered devices. The method further comprises determining a limit for current drawn by the powered device subsystem during transfer of power to the one or more powered devices that results in the transfer of a desired amount of power to the one or more powered devices, and adjusting the limit for the current drawn by the powered device subsystem to the determined current limit.

Example Embodiments

Figure 1:
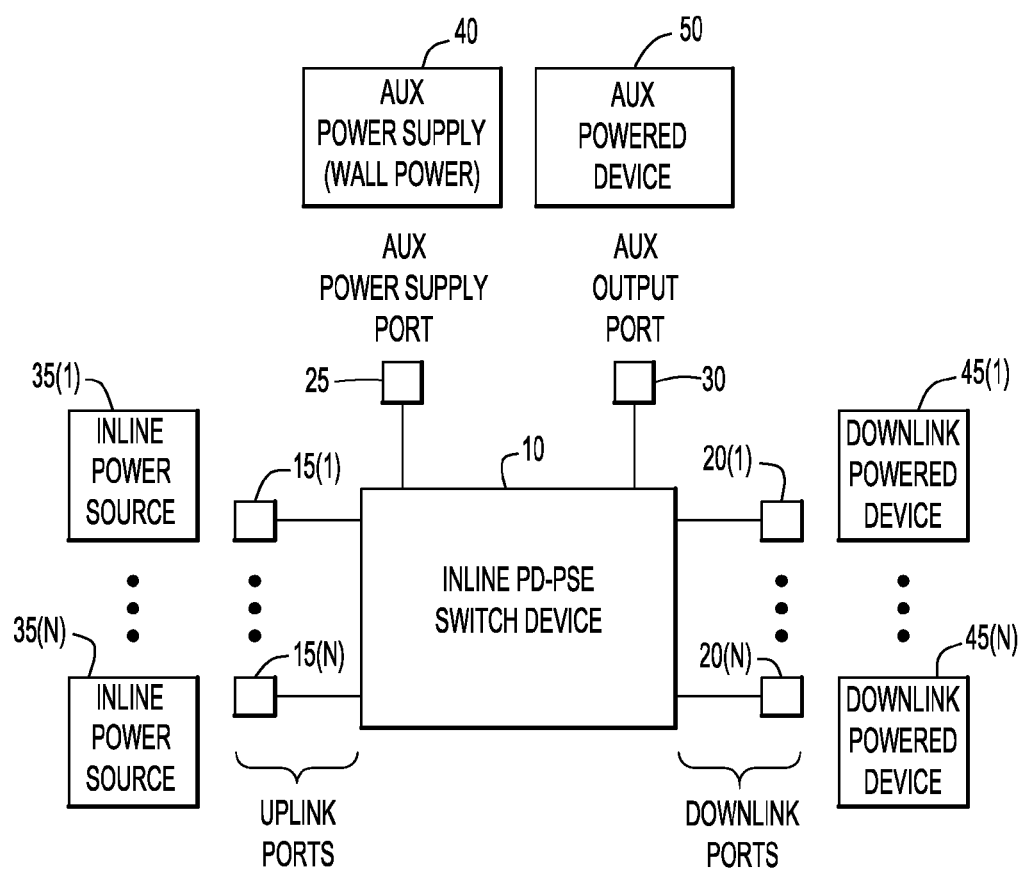
FIG. 1 is a block diagram of an inline PD-PSE switch device configured to transfer a desired amount of power from one or more inline power sources to one or more powered devices.

As previously noted, inline power systems that employ Power over Ethernet (PoE) technology may include an inline power source, sometimes referred to as power sourcing equipment (PSE), or a powered device (PD) that draws power from the inline power source. Also as noted, a specific type of PD is a PD-PSE device that both draws and sources power. FIG. 1 is a schematic diagram of an example PD-PSE device, referred to as inline PD-PSE switch device 10. For ease of reference, the PD-PSE switch device 10 will be referred to simply as inline switch device 10. Inline switch device 10 includes one or more uplink ports 15(1)-15(N), one or more downlink ports 20(1)-20(N), an auxiliary (AUX) power supply port 25, and an AUX output port 30.

As described below, one or more PD subsystems (not shown in FIG. 1) of inline switch device 10 may draw power from one or more inline power sources 35(1)-35(N) via an uplink (input) port 15(1)-15(N). Inline power sources 35(1)-35(N) may comprise, in one example, an Ethernet switch. Power may also be provided to inline switch 10 from an AUX power supply 40 via AUX power supply port 25. AUX power supply 40 may comprise, for example, a wall power supply.

In the example of FIG. 1, the one or more PD subsystems of inline switch device 10 are configured to consume power drawn (received) from inline power sources 35(1)-35(N), and to transfer power to downlink PDs 45(1)-45(N) via downlink ports 20(1)-20(N). Downlink PDs 45(1)-45(N) may include, for example, wireless access points, Internet phones, etc. Alternatively, the one or more PD subsystems may transfer power to an AUX PD 50 via AUX output port 30. AUX PD 50 may comprise, for example, a computer, cell phone, etc. For ease of reference, downlink PDs and AUX PDs will be collectively referred to herein as PDs.

In certain circumstances described further below, inline switch device 10 is configured to transfer a desired amount of power drawn from the inline power sources 35(1)-35(N) to the PDs 45(1)-45(N) and/or AUX PD 50. The desired amount of amount of power may be a predetermined or controlled amount of power selected or determined based on, for example, one or more design requirements or system limitations.

For ease of illustration, examples and system architectures for inline switch device 10 are described herein with reference to the Institute of Electrical and Electronics Engineers (IEEE) 802.3 standards. However, it is to be appreciated that reference to this standard is merely illustrative, and that the examples and architecture described herein may comply with, or may be based on, other standards. Different standards or system limitations are collectively referred to herein as predetermined design requirements.

Figure 2:
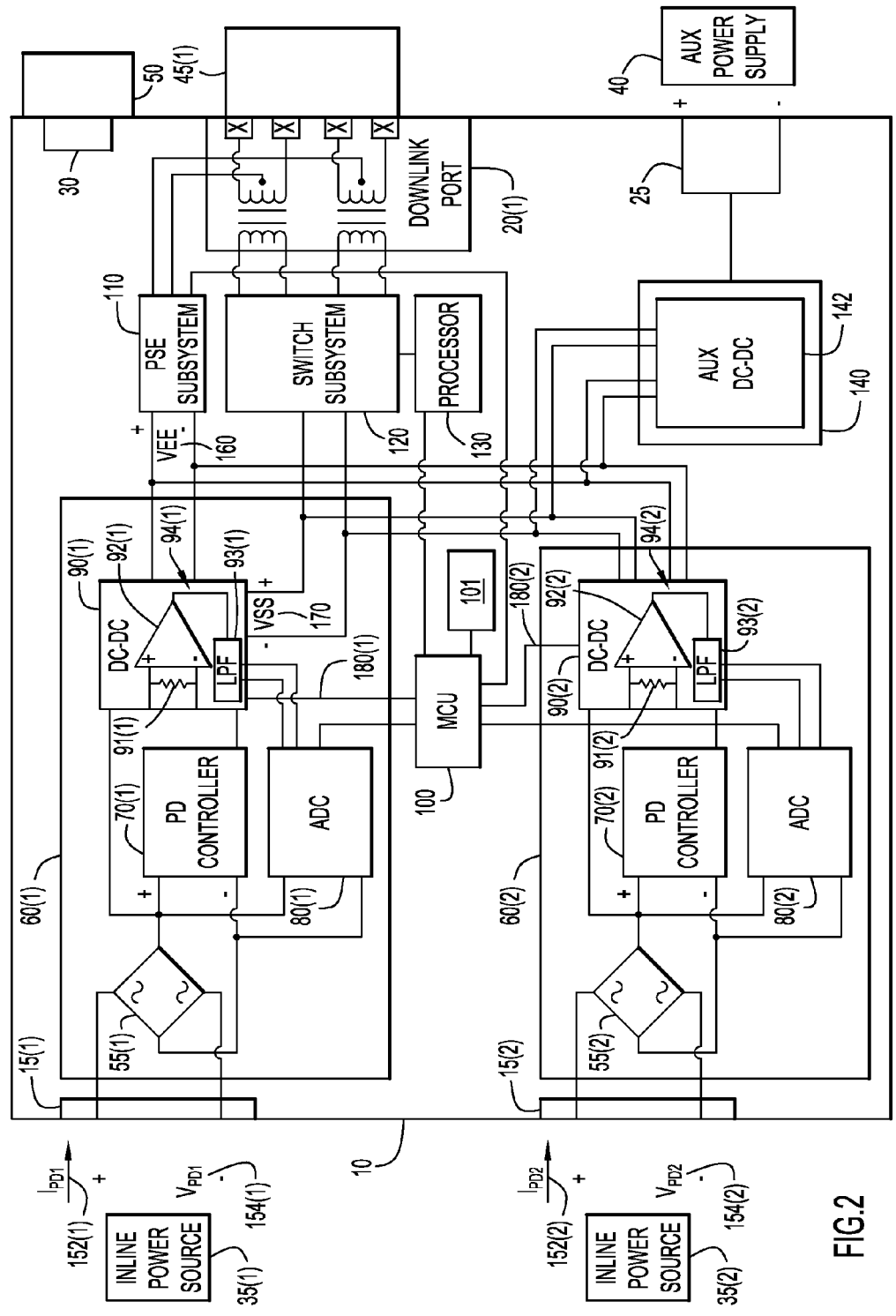
FIG. 2 is a schematic diagram illustrating one example of the PD-PSE inline switch device.

FIG. 2 is a schematic diagram illustrating one example implementation of inline switch device 10 of FIG. 1. In this example, inline switch device 10 comprises first and second uplink ports 15(1) and 15(2) connected to first and second PD subsystems 60(1) and 60(2), respectively. First and second PD subsystems 60(1) and 60(2) each comprise a full-wave rectifier 55(1) and 55(2), respectively, PD controller 70(1) and 70(2), respectively, analog-to-digital converter (ADC) 80(1) and 80(2), respectively, and a direct current-to-direct current (DC-DC) converter 90(1) and 90(2), respectively. DC-DC converters 90(1) and 90(2) each comprise a sense resistor 91(1) and 91(2), respectively, an amplifier 92(1) and 92(2), respectively, and a low-pass filter (LPF) 93(1) and 93(2), respectively. In each DC-DC converter 90(1) and 90(2), the sense resistor, amplifiers, and low-pass filters, make up what is referred to as current sense modules 94(1) and 94(2), respectively. As such, DC-DC converter 90(1) includes current sense module 94(1) and DC-DC converter 90(2) includes current sense module 94(2). Inline switch device 10 further comprises a microcontroller unit (MCU) 100, a PSE subsystem 110, a switch subsystem 120, a processor 130, and an AUX subsystem 140 having an AUX DC-DC converter 142. Also, FIG. 2 shows, as an example, a single downlink port 20(1) and an AUX power supply port 25.

In operation, current ($I_{PD1}$) and voltage ($V_{PD1}$) are received at uplink port 15(1) from inline power source 35(1). Current $I_{PD1}$ is shown at reference numeral 152(1), while voltage $V_{PD1}$ is shown at reference numeral 154(1). Similarly, current ($I_{PD2}$) and voltage ($V_{PD2}$) are received at uplink port 15(2) from inline power source 35(2). Current $I_{PD2}$ is shown at reference numeral 152(2), while voltage $V_{PD2}$ is shown at reference numeral 154(2).

Uplink ports 15(1) and 15(2) each include one or more hardware components that receive the voltages $V_{PD1}$ and $V_{PD2}$, respectively, and provide the voltages to PD subsystems 60(1) and 60(2). These hardware components may include, for example, a connector, physical (PHY) layer components, an Ethernet transformer and other components. For ease of illustration, the components of ports 15(1) and 15(2) have been omitted from FIG. 2.

In the example of FIG. 2, PD subsystems 60(1) and 60(2) include the same components and operate in substantially the same manner. As such, for ease of description, only the operations and components of PD subsystem 60(1) are described in detail herein.

Full-wave rectifier 55(1) performs full-wave rectification to ensure that the voltage $V_{PD1}$ has a polarity that is correct for use by the components of PD subsystem 60(1). The PD controller 70(1) in PD subsystem 60(1) receives voltage $V_{PD1}$ from the full-wave rectifier 55(1), and performs, for example, detection, classification, hot swap operations, etc. PD controller 70(1) then transfers voltage $V_{PD1}$ to DC-DC converter 90(1). Also as shown in FIG. 2, PD subsystem 60(1) includes ADC 80(1) that monitors the voltage provided to PD subsystem 60(1).

DC-DC converter 90(1) converts voltage $V_{PD1}$ to one or more system voltages for use by one or more powered devices connected to inline switch device 10. Two such voltages, VEE 160 and VSS 170, are shown in FIG. 2. VEE 160 may be at approximately 44V to 57V, while VSS 170 may be at approximately 8V to 10V. It would be appreciated that VEE 160 and VSS 170, as well as their illustrated voltage levels, are merely examples and other voltages may be provided.

In FIG. 2, VEE 160 is provided to PSE subsystem 110, while VSS 170 is provided to switch subsystem 120. PSE subsystem 110 and switch subsystem 120 source power to a downlink PD 45(1) connected to downlink port 20(1). In the example of FIG. 2, PD 45(1) is an Internet phone and is connected to PD subsystem 60(1) via port 20(1) and PSE subsystem 100 and/or switch subsystem 120.

For ease of illustration, only one downlink PD 45(1) and one downlink output port 20(1) are shown in FIG. 2. It is to be appreciated that, in alternative implementations, a plurality of downlink PDs may be provided and each PD may be connected to a separate downlink port, such as additional ports 20(2)-20(N) shown in FIG. 1. Alternatively, power may also be transferred to AUX PD 50 connected to AUX port 30. As noted above with reference to FIG. 1, downlink PDs and AUX PDs are collectively referred to herein as PDs, and the examples of FIG. 1 are generally described with reference to a single PD 45(1).

In the example of FIG. 2, port 20(1) is shown having two transformers. It would be appreciated that the use of two transformers is merely an example and that port 20(1) may contain more transformers to support higher speed data rates such as, for example, 1 Gigabit/second (Gb/s).

In the example of FIG. 2, a processor 130 is provided. Processor 130 supports the operations of switch subsystem 120 and is connected to MCU 100. It is to be appreciated that the operations described below may be performed by the MCU 100, or may be performed by processor 130 and the results provided to MCU 100.

Inline switch device 10 also includes an AUX power supply port 25 that receives power from AUX power supply 40. In the example of FIG. 2, AUX power supply 40 is an alternating current-to-direct current (AC-DC) power supply that is external to inline switch device 10. However, in an alternative arrangement, the AC-DC power supply may be in the inline switch device 10 and is configured to connect to an AC power supply via an AC plug. In either variation, DC power is provided to AUX subsystem 140. AUX subsystem 140 may comprise, for example, one or more of the same elements as described above with reference to PD subsystem 60(1). In particular, AUX subsystem 140 includes an AUX DC-DC converter 142 that may transfer received power to PSE subsystem 110 and switch subsystem 120.

In the example of FIG. 2, $I_{PD1}$ and $V_{PD1}$ provide power to PD subsystem 60(1). PD subsystem 60(1) will consume a portion of this power, but will also transfer a portion of this power to PD device 45(1) that is connected thereto (via port 20(1), PSE subsystem 110 and/or switch subsystem 120). During this transfer, DC-DC converter 90(1) draws an amount of current. Inline switch device 10 is configured to transfer a desired amount of power through PD subsystem 60(1) to PD 45(1) by adjusting the limit on the current that may be drawn by DC-DC converter 90(1). This current limit is referred to herein as $I_{LIM1}$. Inline switch device 10 is also configured to transfer a desired amount of power through PD subsystem 60(2) to PD 45(1) by adjusting the limit on the current that may be drawn by DC-DC converter 90(2). This current limit is referred to herein as $I_{LIM2}$.

Control of $I_{LIM1}$ and $I_{LIM2}$ is achieved by control signals 180(1) and 180(2) received at DC-DC converters 90(1) and 90(2), respectively, from MCU 100. MCU 100 (and/or processor 130) is configured to perform one or more operations that determine the appropriate levels for $I_{LIM1}$ and $I_{LIM2}$ that result in the desired transfer of power by PD subsystems 60(1) and 60(2) to PD 45(1).

In one form, transferring a desired amount of power refers to power transfer that provides a maximum allowed amount of power to PD 45(1) without violating predetermined design requirements. In another form, PD subsystems 60(1) and 60(2) each deliver power to PD 45(1). In such an example, transferring a desired amount of power refers to power transfer that provides a controlled level of power to PD 45(1) from each of the subsystems 60(1) or 60(2), without overburdening either PD subsystem. In other words, there is balanced load sharing between PD subsystems 60(1) and 60(2) such that the delivery of power to PD 45(1) is desirably divided between PD subsystem 60(1) and 60(2).

In certain circumstances, each of PD subsystem 60(1) and 60(2) may be connected to different types of inline sources that provide different amounts of power (i.e., an inline power source may be Type-1 that delivers 13 W at the PD subsystem or Type-2 that delivers 25.5 W at the PD subsystem). In these examples, if different sources are provided, the amount of power received by each of PD subsystem 60(1) and 60(2) may be different and, accordingly, each PD subsystem 60(1) and 60(2) may have different power delivery capabilities (i.e., one may be better suited to provide power to PD 45(1) than the other). In these circumstances, the desired division of the power delivery between PD subsystems 60(1) and 60(2) may not be an equal power division, but rather may be pro-rated between the subsystems. That is, the PD subsystem that has a greater power delivery capability will provide a greater portion of the power to PD 45(1).

The temperature of each PD subsystem 60(1) and 60(2) is proportional to the PD load. Balancing PD load power results in PD subsystems 60(1) and 60(2) with similar temperatures. This permits more power to be transferred to PD 45(1) when compared to systems that do not load balance.

When the current drawn by DC-DC converters 90(1) or 90(2) reach $k_m$ or $I_{LIM2}$, respectively, the DC-DC converters stop drawing current. This may be the case even if there is a load on the DC-DC converters 90(1) or 90(2) that is demanding more power. As such, once the current drawn by a DC-DC converter 90(1) or 90(2) approaches $I_{LIM1}$ or $I_{LIM2}$, respectively, the output voltages of the DC-DC converters will decrease or drop to limit the current. In one example, when the voltage of DC-DC converter 90(1) drops, PD subsystem 60(2) will start supplying power or supply additional power.

In certain examples $I_{LIM1}$ and/or $I_{LIM2}$ are determined using information ($V_{PD1}$ or $V_{PD2}$) received via ADCs 80(1) and 80(2), respectively. In one specific example, ADCs 80(1) and 80(2) obtain additional information ($I_{PD1}$ and $I_{PD2}$) from components of DC-DC converters 90(1) and 90(2), namely from current sense modules 94(1) and 94(2), respectively. Details of this example implementation are provided below.

MCU 100 (and/or processor 130) implements one or more methods to determine the levels of $I_{LIM1}$ and $I_{LIM2}$ that results in a desired transfer of power in inline switch device 10. MCU 100 may utilize memory 101 that includes logic for implementation of these methods. Memory 101 may comprise read only memory (ROM), random access memory (RAM), magnetic disk storage media devices, optical storage media devices, flash memory devices, electrical, optical, or other physical/tangible memory storage devices. MCU 100 is, for example, a microprocessor or microcontroller that executes instructions for the process logic stored in memory 101. Thus, in general, the memory 101 may comprise one or more computer readable storage media (e.g., a memory device) encoded with software comprising computer executable instructions and when the software is executed (by MCU 100 and/or processor 130) it is operable to perform the operations for determining the current limits that results in a desired transfer of power in inline switch device 10. Further details of these different operations are provided below.

Figure 3:
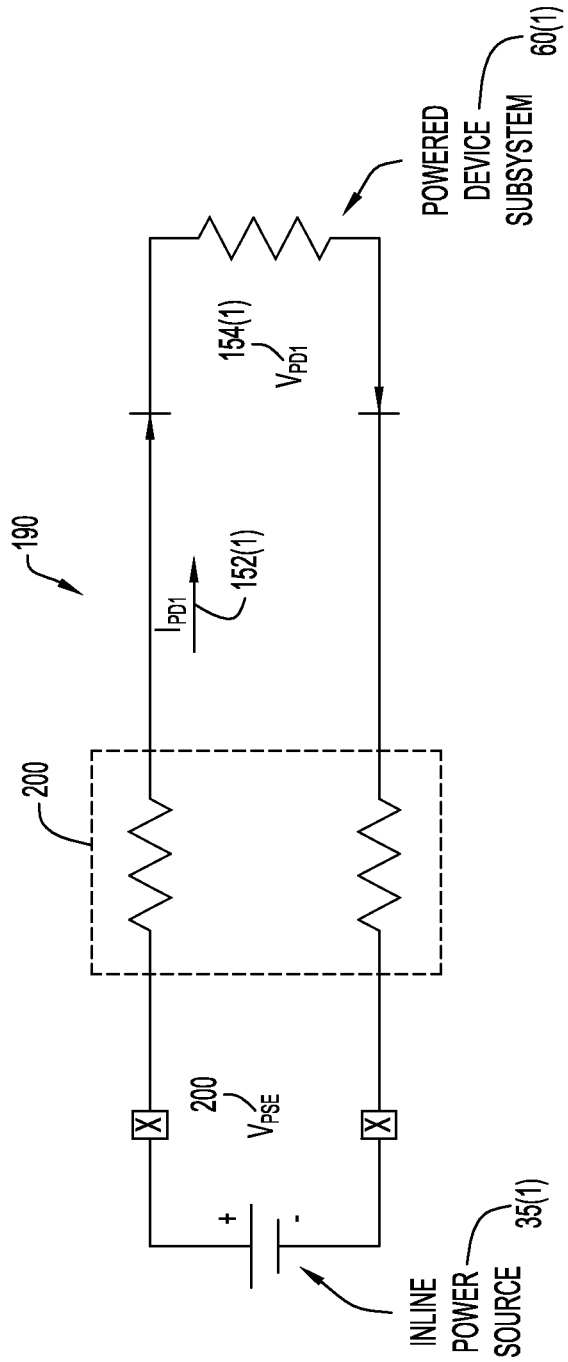
FIG. 3 is a schematic diagram illustrating a simplified common mode view of an inline power source connected to a powered device subsystem in the PD-PSE inline switch device.

As noted above, PD subsystems 60(1) and 60(2) each draw power from an inline power source 35(1) or 35(2), respectively. FIG. 3 is a schematic diagram illustrating a common mode view of PD subsystem 60(1) connected to inline power source 35(1) via a channel 190 formed by an Ethernet cable.

As shown in FIG. 3, an inline power source 35(1) generates a voltage, shown as $V_{PSE}$ 200, resulting in a voltage $V_{PD1}$ 154(1) at PD subsystem 60(1) and a current $I_{PD1}$ 152(1) through channel 190. Channel 190 also comprises a channel resistance ($R_{CHAN}$). As detailed below, estimates, predetermined values for, or measurements of one or more of these values ($V_{PD1}$, $V_{PSE}$, $I_{PD1}$ or $R_{CHAN}$) may be used by MCU 100 and/or processor 100 to determine $I_{LIM1}$. The power of a PD subsystem ($P_{PD}$) may have a first power level ($P_{PD1}$) or a second power level ($P_{PD2}$). Similar values determined with respect to inline power source 35(2) and PD subsystem 60(2) may be used to determine $I_{LIM2}$. For ease of reference, $I_{LIM}$ determinations will be described with specific reference to $I_{LIM1}$ and the schematic diagram of FIG. 3.

Figure 4:
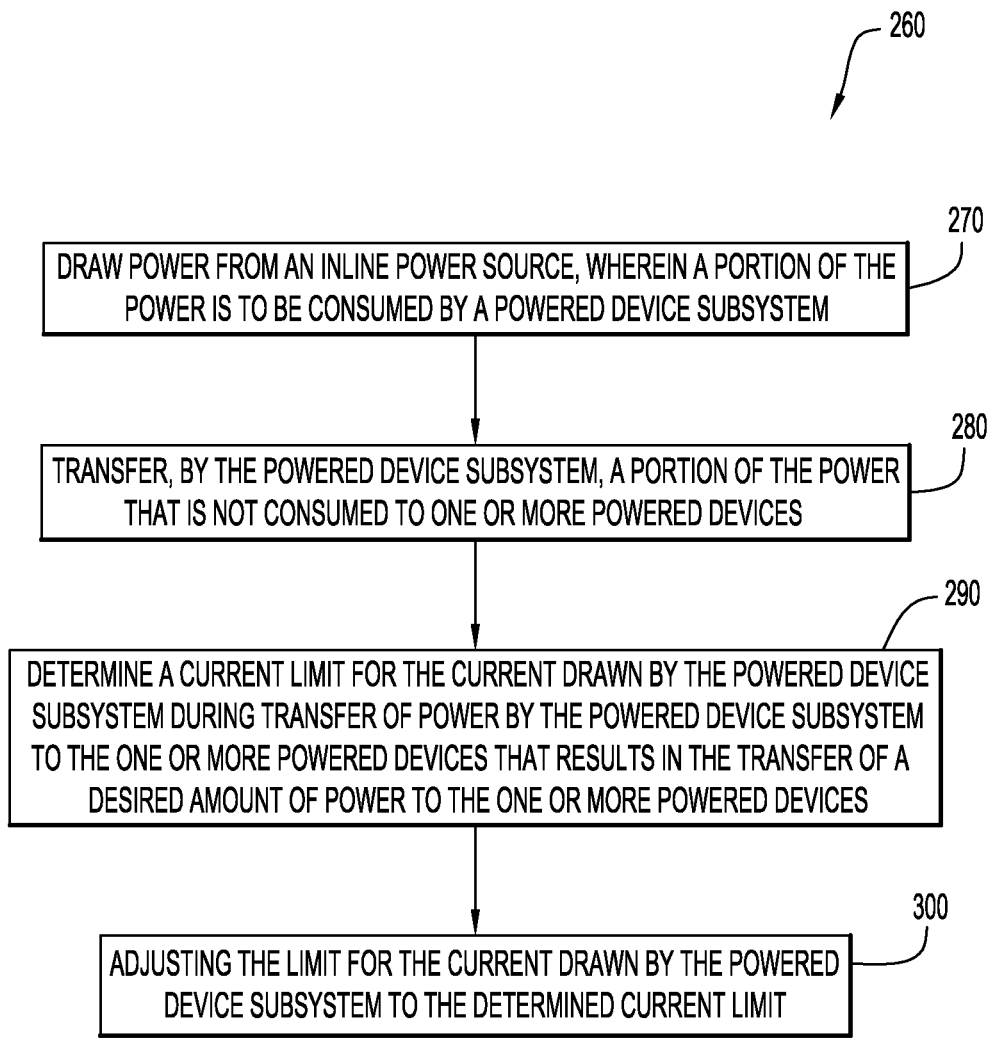
FIG. 4 is a flowchart illustrating an example method for transferring a desired amount of power through the powered device subsystem in the PD-PSE inline switch device.

FIG. 4 is a high level flowchart illustrating an example method 260 implemented by inline switch device 10. Method 260 begins at 270 where power is drawn from inline power source 35(1) such that a portion of the power is consumed by PD subsystem 60(1). At 280, a portion of the power that is not consumed by PD subsystem 60(1) is transferred to one or more PDs connected to PD subsystem 60(1). In the example of FIG. 2, the one or more PDs are represented by PD 45(1).

At 290, $I_{LIM1}$ (i.e., the current level for the transfer of power by the PD subsystem 60(1) to PD 45(1) that results in the transfer of a desired amount of power to PD 45(1)) is determined. At 300, the current limit for the current drawn by the PD subsystem 60(1) is adjusted to the determined current limit ($I_{LIM1}$).

Figure 5:
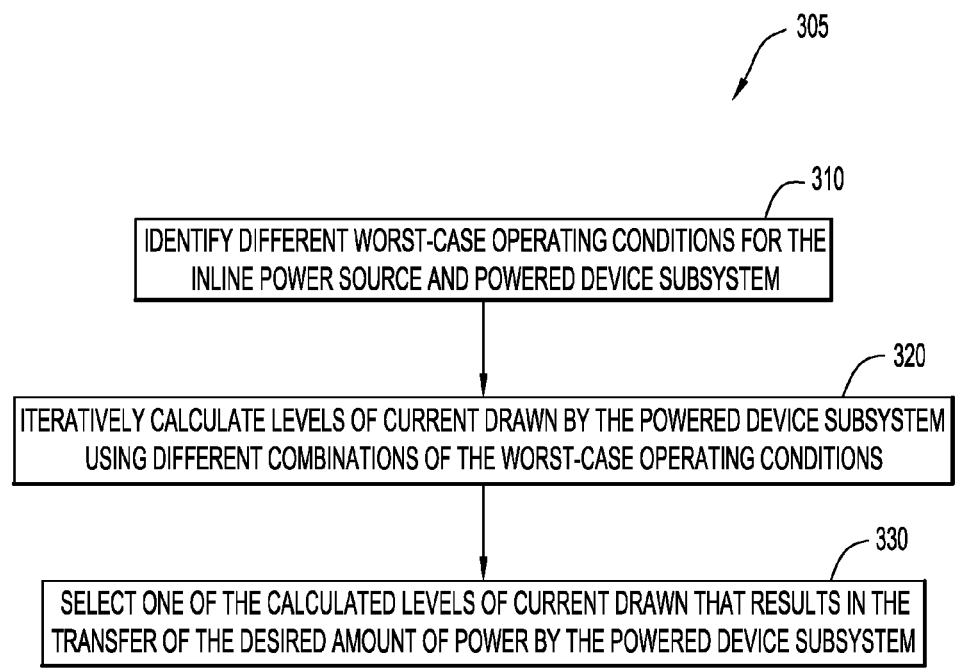
FIG. 5 is a flowchart illustrating an example method for determining a current limit for the transfer of power by the powered device subsystem to the one or more powered devices.
Figure 6:
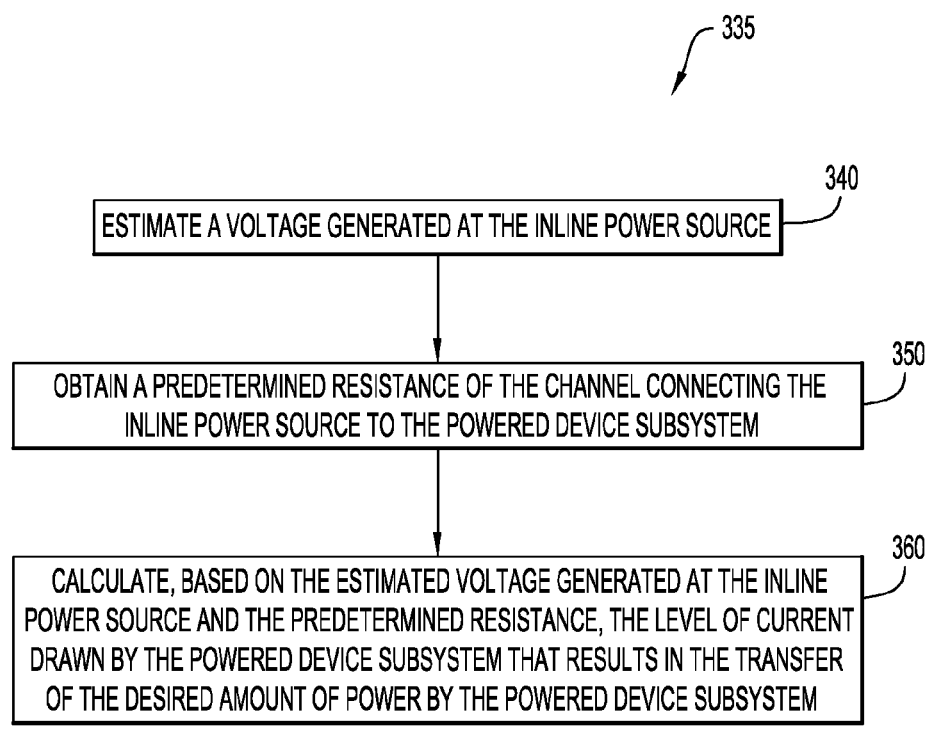
FIG. 6 is a flowchart illustrating another example method for determining a current limit for the transfer of power by the powered device subsystem to the one or more powered devices.
Figure 7:
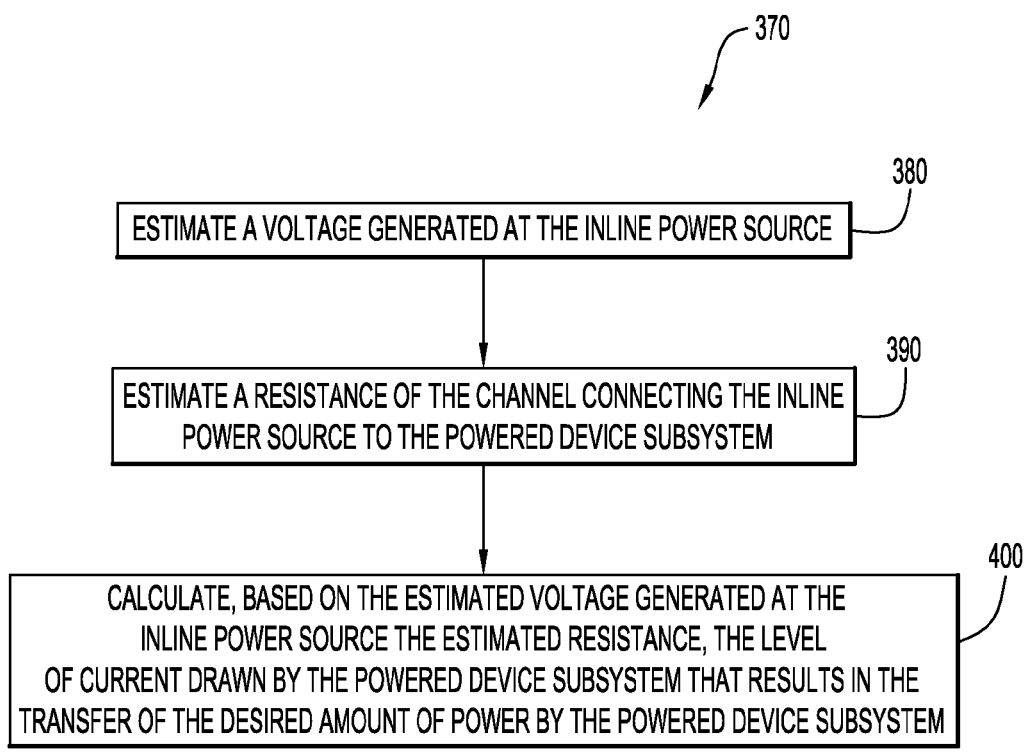
FIG. 7 is a flowchart illustrating a further example method for determining a current limit for the transfer of power by the powered device subsystem to the one or more powered devices.

Several methods for determining $I_{LIM1}$ are illustrated in FIGS. 5-7. The operations described in these methods may be performed by, for example, MCU 100 and/or by processor 130.

FIG. 5 is a flowchart of a first method 305 for determining $I_{LIM1}$. In this case, one or more known or predetermined values for worst-case operating conditions are used in the determination of $I_{LIM}$. As noted above with reference to FIG. 3, PD subsystem 60(1) draws power from inline power source 35(1) resulting in values for $V_{PD1}$, $V_{PSE}$, $I_{PD1}$ and $R_{CHAN}$. At 310, different worst-case operating conditions for inline power source 35(1) and powered device subsystem 60(1) are obtained. The worst-case operating conditions are values of one or more of $V_{PD1}$, $V_{PSE}$, $I_{PD1}$, $R_{CHAN}$ or power consumed by PD subsystem 60(1) that make it most likely that predetermined design requirements, such as those set forth in the IEEE 802.3 standards, are not violated. At 320, levels of current drawn by powered device subsystem are iteratively calculated using different combinations of the worst-case operating conditions. These calculations may then be used to determine the acceptable margins for adjustment of parameter values to get the correct $I_{LIM1}$. More specifically, at 330, one of the calculated current levels of current drawn is determined to be the current limit level at which a desired amount of power is transferred by PD device subsystem 60(1).

It is to be appreciated that the worst-case operating condition values may be identified, for example, during design of the device. The $I_{LIM}$ may then, therefore, be a pre-calculated value that is stored for use by MCU 100 and thus is not calculated in real-time.

In the example of FIG. 5, $V_{PSE}$ used in the determination may be assumed to be at a minimum level. This is considered a worst-case operating condition because this minimum $V_{PSE}$ leads to a higher current provided to PD subsystem 60(1). Since there is a predetermined design limit on the current level that may be passed through channel 190, the use of the minimum $V_{PSE}$ increases the chances that $I_{PD1}$ will exceed the design limit. This may also depend on the IEEE 802.3 Type of PSE and/or PD used.

FIG. 6 is a flowchart of a second method 335 for determining $I_{LIM1}$ resulting in the desired transfer of power from PD subsystem 60(1) to PD 45(1). In this method, at 340, the voltage of inline power source ($V_{PSE}$) is estimated. At 350, a predetermined $R_{CHAN}$ (resistance in the channel connecting inline power source 35(1) to PD subsystem 60(1)) is obtained. At 360, using the estimated $V_{PSE}$ and obtained predetermined $R_{CHAN}$, the level of current drawn by the powered device subsystem that transfers the desired power (i.e., $I_{LIM1}$) is calculated.

More specifically, the power transferred through PD subsystem 60(1) may be set to a desired amount by estimating $V_{PSE}$ and using a worst-case $R_{CHAN}$ value to calculate $I_{LIM1}$. The accuracy of the $V_{PSE}$ estimate is taken into account so that the calculated value of $I_{LIM1}$ meets the system power transfer requirements for either extreme in the voltage estimate.

The channel current, $I_{PD}$, for a PD subsystem, such as PD subsystem 60(1) is given as shown below in Equation (1).

$$I_{PD} = \frac{V_{PSE} - \sqrt{V_{PSE}^2 - 4R_{chan}P_{PD}}}{2R_{chan}} \quad \text{Equation (1)}$$

The power of inline power source 35(1) ($P_{PSE}$) is the product of the $I_{PD1}$ and the $V_{PSE}$. When a PSE is connected to a single PD, the system may enter a low power state Ppm that draws more than the IEEE 803.2 DC maintain power signature (MPS) current, and less than the PD maximum power allowance. A smaller PD power draw produces a more accurate estimate of $V_{PSE}$ because there is less voltage drop on the channel resistance. $V_{PSE}$ is assumed to equal $V_{PD1-1}$ (a low voltage level of $V_{PD1}$) when PD subsystem 60(1) is drawing $P_{PD1}$. $I_{LIM1}$ may be calculated using one or more of the above formulas, the estimate for $V_{PSE}$, a worst-case IEEE value or better estimate for $R_{CHAN}$, and an estimate for the PD operating power maximum. The power consumed by PD subsystem 60(1) may be reduced to take the system tolerance into account so that PD load changes do not cause an IEEE 802.3 channel current violation. Alternatively, this current may be adjusted higher to account for system tolerances.

A worst-case estimate for $R_{CHAN}$ may also be used. The resistance may be the IEEE DC pair loop resistance maximum, or a minimum of about 0.25 ohms. More power is delivered at a lower $R_{CHAN}$, therefore, 0.25 ohms may be used, for example, as the worst-case $R_{CHAN}$.

Alternatively, the IEEE 803.3 specified PSE power limit may be used to determine $I_{LIM1}$. For example, for a Type-2 system (25.5 W PD power), a loop channel resistance of 12.5 ohms and a $V_{PSE}$ of 50 V may be used. This produces a power for the inline power source ($P_{PSE}$) of 30 W. This value of $P_{PSE}$ and the estimated $V_{PSE}$ ($V_{PSE\_est}$) determine $I_{PD}$, where $I_{PD} = P_{PSE}/V_{PSE\_est}$.

The $P_{PD}$ may then be calculated using Equation (2) (which is a mathematical manipulation of Equation (1)).

$$P_{PD} = \frac{V_{PSE}^2 - (V_{PSE} - I_{PD}2R_{chan})^2}{4R_{chan}} \quad \text{Equation (2)}$$

For example, if $V_{PSE\_est}$=53 V, then $I_{PD}$=30 W/53V (i.e., 0.566 A), then the PD may consume up to $P_{PD}$=29.9 W without exceeding IEEE worst-case PSE power minimums for Type-2 operation.

FIG. 7 is a flowchart of another method 370 for determining $I_{LIM1}$ that results in the transfer of a desired amount power by PD subsystem 60(1) to PD 45(1). At 380, the voltage of inline power source ($V_{PSE}$) is estimated. At 390, an estimate of $R_{CHAN}$ (i.e., resistance in channel 190 connecting inline power source 35(1) to PD subsystem 60(1)) is generated. At 400, using the estimated $V_{PSE}$ and estimated $R_{CHAN}$, the level of current drawn by PD subsystem 60(1) that results in the transfer of the desired power is calculated.

More specifically, this approach uses the operations of FIG. 6, but further estimates $R_{CHAN}$. The use of a more accurate $V_{PSE}$ and $R_{CHAN}$ produces a more precise $I_{LIM1}$.

The following two system equations, Equations (3) and (4) below represent the level of $V_{PD1}$ at two different operating conditions:

$$V_{PSE} - \frac{P_{PD1}}{V_{PD1}}R_{chan} = V_{PD1-1} \quad \text{Equation (3)}$$

$$V_{PSE} - \frac{P_{PD2}}{V_{PD2}}R_{chan} = V_{PD1-2} \quad \text{Equation (4)}$$

The $V_{PSE}$ and $R_{CHAN}$ are assumed constant. The above equations may be mathematically manipulated to provide Equation (5), below, for the $R_{CHAN}$.

$$R_{chan} = \frac{V_{PD1-1} - V_{PD1-2}}{\frac{P_{PD2}}{V_{PD1-2}} - \frac{P_{PD1}}{V_{PD1-1}}} = \frac{\Delta V}{\Delta I} \quad \text{Equation (5)}$$

As shown, $R_{CHAN}$ is the ratio of the change in $V_{PD1}$ to the change in $I_{PD1}$. For example, if $P_{PD1}$=4 W, $V_{PD1-1}$ ($V_{PD1}$ voltage at a first level)=52.0 V, $P_{PD2}$=10 W, $V_{PD1-2}$ ($V_{PD1}$ at a second level)=50.5V, then, using the above formula, $R_{CHAN}$ is 12.4 ohms.

The same two measurements permit a more accurate $V_{PSE}$ estimate to be created using the following two equations, Equations (6) and (7).

$$V_{PSE} = V_{PD1-1} + \frac{P_{PD1}}{V_{PD1-1}}R_{chan} \quad \text{Equation (6)}$$

$$V_{PSE} = V_{PD1-2} + \frac{P_{PD2}}{V_{PD1-2}}R_{chan} \quad \text{Equation (7)}$$

Both of the above equations result in the same value of $V_{PSE}$.

Figure 8A:
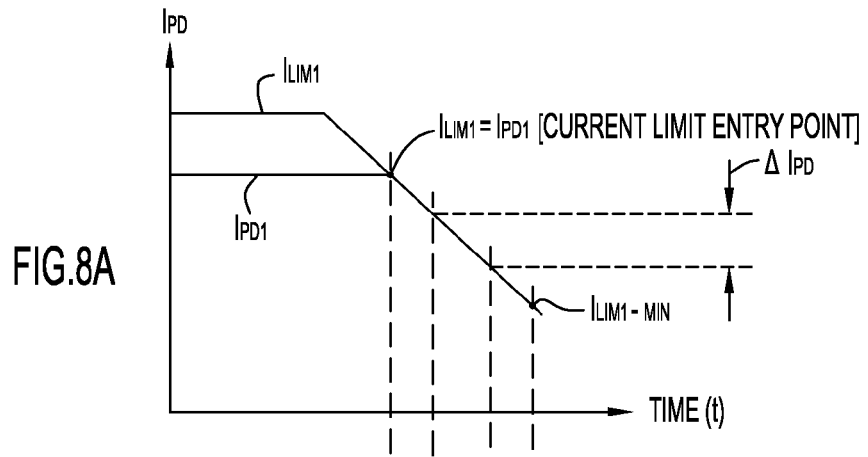
FIG. 8A is a plot of current versus time of a powered device subsystem in one example implementation.
Figure 8B:
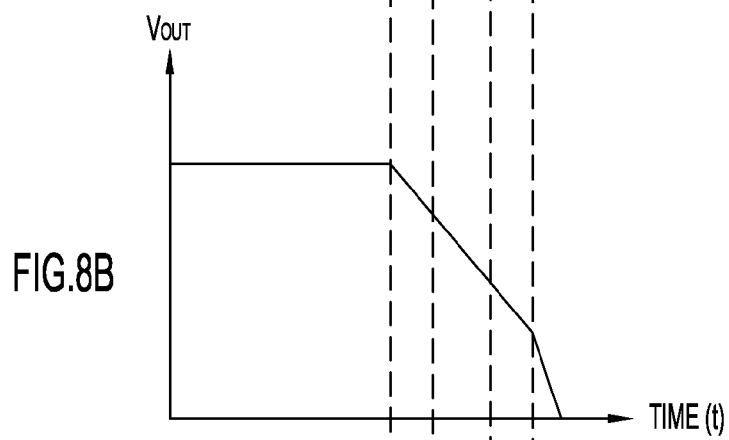
FIG. 8B is a plot of output voltage versus time of the powered device subsystem for the example implementation corresponding to the current plot of FIG. 8A.
Figure 8C:
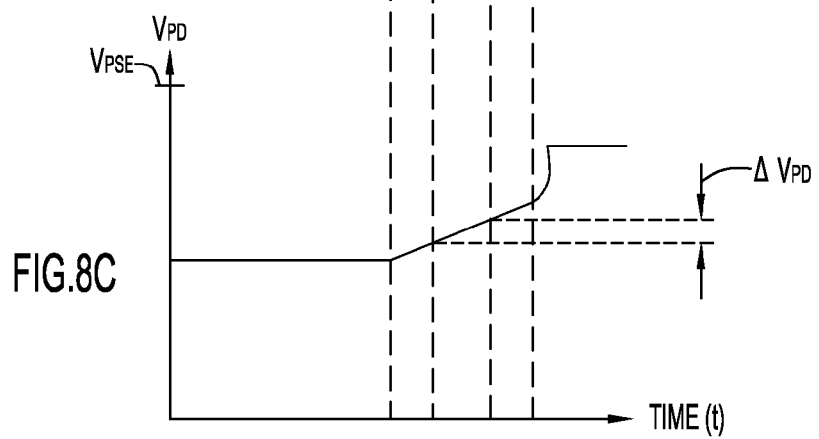
FIG. 8C is a plot of input voltage versus time of the powered device subsystem for the example implementation corresponding to the current plot of FIG. 8A.

FIG. 8A is a graph illustrating the current of PD subsystem 60(1) in one example implementation, while FIG. 8B illustrates an output voltage ($V_{OUT}$) of PD subsystem 60(1). $V_{OUT}$ of PD subsystem 60(1) may be, for example, VEE, VSS or another output voltage. FIG. 8C illustrate the input voltage of PD subsystem 60(1).

As shown in FIG. 8A, PD subsystem 60(1) draws current $I_{PD1}$ and has a current limit of $I_{LIM1}$. At the start, the current drawn is less than the set current limit. When $I_{LIM1}$ is reduced to the point where $I_{PD1}$ equals $I_{LIM1}$, the system enters current limit. If $I_{LIM1}$ is further reduced, the output voltage of DC-DC converter 90(1) (shown in FIG. 8B) decreases and the input voltage of PD subsystem 60(1) (shown in FIG. 8C) increases. Continuing to the decrease $I_{LIM1}$ to $I_{LIM1\text{-}MIN}$ eventually results in a reduction in one or more output voltages of the DC-DC converter 90(1) to a point where inline switch device 10 begins to fail. This may reduce the load demand because systems are shut down or are otherwise inoperable. At or below $I_{LIM1\text{-}MIN}$, inline switch device 10 does not support all of its possible functionality. The load reduction results in an increase in $V_{PD1}$. The $R_{CHAN}$ may be characterized between the points when the system enters current limit and when $I_{LIM1\text{-}MIN}$ is reached.

Figure 8D:
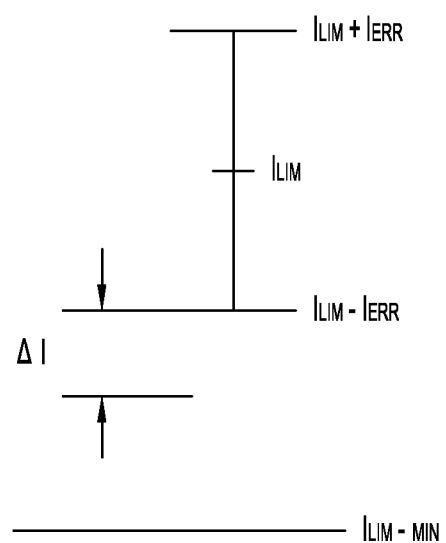
FIG. 8D is a plot of a set current limit of the powered device subsystem for the example implementation corresponding to the current plot of FIG. 8A.

FIG. 8D shows an example of a set $I_{LIM1}$. PD subsystem 60(1) operates in an error range ($I_{ERR}$) around $I_{LIM1}$ that exists as a result of system tolerances. The system is designed so that the lower bound of $I_{LIM}$ accounts for $I_{ERR}$ so as to remain above $I_{LIM1\text{-}MIN}$. The $\Delta I$ used to affect $I_{LIM1}$ fits within the range $I_{LIM1}\text{-}I_{ERR}$ and $I_{LIM1\text{-}MIN}$.

As noted above, in the example of FIG. 7, estimates for $V_{PSE}$ and $R_{CHAN}$ are generated using measured voltage values for the input voltage ($V_{PD1}$) of PD subsystem 60(1). In certain circumstances, the method of FIG. 7 may be enhanced by obtaining measurements of $I_{PD1}$ (current of PD subsystem 60(1)). As noted above with reference to FIG. 2, DC-DC converters 90(1) and 90(2) may include current sense modules 94(1) and 94(2) that facilitate the measurement of $I_{PD1}$ and $I_{pD2}$ (via sense resistors 91(1) and 91(2) and amplifiers 92(2) and 92)). Low-pass filters 93(1) and 93(2) provide the estimate of the average $I_{PD1}$ and $I_{PD2}$, respectively, to ADCs 80(1) and 80(2). It should be appreciated that sense resistors 91(1) and 91(2) may be replaced with, for example, a metal-oxide-semiconductor field-effect transistor (MOSFET) and current mirror as known in the art.

In the arrangement of FIG. 2, current sense modules 94(1) and 94(2) are connected to ADCs 80(1) and 80(2), respectively. As such, ADCs 80(1) and 80(2) can obtain a code representing $I_{PD1}$ and $I_{PD2}$ and provide these values to MCU 100. As the power level of, for example, PD subsystem 60(1) is changed, these elements allow for a measurement of the change in $I_{PD1}$ ($\Delta I$) which, with a measured change in voltage ($\Delta V$) allows for the estimation of $R_{CHAN}$ as shown above in Equation (5). VPSE may then be estimated as shown above in Equation (6) or Equation (7). ADCs 80(1) and 80(2) each have a multiplexer that directs the $V_{PD}$ or $I_{PD}$ to elements of the ADC that convert the voltage/current to a code.

It should be appreciated that current of PD subsystems may be measured directly or indirectly from PD subsystems 60(1) and 60(2) in a number of different manners. For example, voltage may be measured as shown above in the example of FIG. 2), current may be directly measured, or current could be measured and translated to a voltage code for subsequent use. All of these different current measurement methods are within the scope of the present disclosure.

In certain circumstances, inline switch device 10 may facilitate one or more of the above methods by providing a handshake mechanism to determine when PD subsystem 60(1) may move from a first power state drawing a first average power, referred to above using $P_{PD1}$ to a new power state drawing a second average power, referred to above as $P_{PD2}$. The handshake may be a hardware or software handshake and may comprise the following steps:

1. PD subsystem 60(1) is powered on and remains in power state $P_{PD1}$.
2. $V_{PD1\text{-}1}$ (The voltage of $V_{PD1}$ at power point 1) is measured by ADC 80(1) and MCU 100 obtains a digital representation of $V_{PD1\text{-}1}$.
3. PD subsystem 60(1) proceeds to the next power state $P_{PD2}$.
4. Processor 130 signals to MCU 100, using a handshake, that the PD subsystem 60(1) is now consuming $P_{PD2}$.
5. $V_{PD1\text{-}2}$ (The voltage of $V_{PD1}$ at power point 2) is measured by ADC 80(1) and MCU 100 obtains a digital representation of $V_{PD1\text{-}2}$.
6. MCU 100 returns the handshake to processor 130, signaling that the PD subsystem 60(1) may proceed to another power state.
7. MCU 100 calculates $R_{CHAN}$.
8. MCU 100 calculates $I_{LIM}$ using the channel characterization data $R_{CHAN}$, $V_{PSE}$, and $P_{PD}$, where $P_{PD}$ is the maximum average power desired at the PD.

As noted above, in certain circumstances multiple inline power sources 35(1) and 35(2) may provide power to inline switch device 10. When multiple power sources provide power to the system, $I_{LIM1}$ and/or $I_{LIM2}$ may be calculated in a different way. These different calculations may be utilized because the inline switch device 10 is already operating from an alternate supply when an additional power source is added. Table 1, below, provides a list of different scenarios, a description of the scenario, and an example method for calculating $I_{LIM1}$ or $I_{LIM2}$ (simply $I_{LIM}$) in the scenario. In this table, PD1 is PD subsystem 60(1), PD2 is PD subsystem 60(2), and AUX is AUX subsystem 140.

TABLE 1

| PD1 | PD2 | AUX | Description |
|---|---|---|---|
| 1 | 0 | 0 | One PD (PD1) is operating with no AUX. PD power demand depends on system power. The power budget is known. Use any of the above methods to determine $I_{LIM}$. In a well behaved system, $I_{LIM}$ will generally not be reached. |
| 0 | 1 | 0 | |
| 1 | 1 | 0 | Two PDs no AUX. Calculate $I_{LIM}$ using a modified way as described with reference to FIG. 7, but add operations in which the PDs are placed in a current limit and then $R_{CHAN}$ is determined by monitoring PD voltages for PD current changes. |
| 1 | 1 | 1 | Two PDs with AUX. Use worst-case $I_{LIM}$, then adjust $I_{LIM}$ using the modified way if AUX is removed. |

It is noted that $I_{LIM1}$ or $I_{LIM2}$ is only setup for PD subsystems 60(1) and 60(2), respectively, and not for AUX subsystem 140. The AUX DC-DC converter 142 has more power ability than the PD subsystems combined power and therefore, the AUX DC-DC converter current limit is normally a fixed value determined by its power ability.

Methods described above may be used, for example, to characterize a single PD subsystem (e.g., PD subsystem 60(1)) that transfers power received from an inline power source (e.g., inline power source 35(1)) to a load. In certain circumstances, inline switch device 10 may receive power from two or more inline power sources. In one such example, PD subsystem 60(1) is operating with a load (i.e., transferring power from inline power source 35(1) to the load), and then the second PD subsystem 60(2) is added. More specifically, it is assumed that PD subsystem 60(1) has been powered on and is supplying power to downlink port 20(1) and connected PD 45(1). Subsequently, PD subsystem 60(2) is connected and powered on to transfer power from a second inline power source 35(2) to connected PD 45(1) (and/or to a different load). In this example, PD subsystems 60(1) and 60(2) may both be characterized using an alternative method described below.

As noted, power is transferred from each of PD subsystem 60(1) and 60(2) to a load. In the alternative method, the responsibility for supplying power to the load is transferred or shifted from one PD subsystem to the other. The shift in responsibility for supplying power (i.e., the change in the amount of power supplied by each of PD subsystem 60(1) and 60(2)) is designated as ΔP. This ΔP causes a change in the current for both PD subsystems 60(1) and 60(2). Inline switch device 10 is entering current limit when the shift in the power transfer responsibility is performed. Because the channel characteristics for each PD subsystem 60(1) and 60(2) may not be identical, shifting power supply responsibility from one PD to another may result in different current changes for each PD.

The shift in power should be large enough to cause a measureable change in the PD subsystem input voltage. The power may be increased by delaying the shift in power supply responsibility until the power demands are higher, but still within the operating limits of the inline switch device 10. The shift in power delivery responsibility should generally be completed before either PD subsystem 60(1) or 60(2) is within ΔP of the system power transfer limit. The system power transfer limit is determined by a system constraint such as, for example, the maximum PD power allowed for the PSE connected to the PD subsystem.

Changing a PD $I_{LIM}$ changes $I_{PD}$ by ΔI, causes a drop in an output voltages ($V_{OUT}$) (e.g., VEE or VSS) of the DC-DC converter, and causes a change in $V_{PD}$ ($\Delta V_{PD}$). The value used for ΔI is based on how finely the ADC 80 can resolve ΔV, where ΔV is the product of $R_{CHAN}$ and ΔI.

This method evaluates voltage differences measured by an ADC which helps eliminate the ADC offset voltage error present. An integrating ADC may also be used to help reduce noise due to AC power sources.

The minimum ΔI can be approximated by Equation (8), shown below.

$$\Delta I \approx \frac{\Delta P_{PD}}{V_{PD}} \qquad \text{Equation (8)}$$

In Equation (8), $\Delta P_{pD}$ is the change in the PD power and $V_{PD}$ is the PD input voltage at the present operating condition before the $\Delta P_{pD}$ change. Due to the fact that the channel has resistance, $V_{PD}$ will change as a result of the PD power change. The new voltage will be lower for an increase in PD power and higher for a decrease in PD power. The power transfer may not be equal for each PD. This is taken into account so that the system power demand supported by the $I_{LIM}$ settings on the PDs is higher than what is used by the system to function.

In the alternative method, the following steps may be implemented to characterize PD subsystem 60(2). For the purposes of the following description, PD subsystem 60(1) is fully characterized using one of the methods described above (i.e., $V_{PSE}$, $R_{CHAN}$, $P_{PD}$ associated with PD subsystem 60(1) are known).

After constant load is established, an estimate of the approximate PD power demand is generated using, for example, statistical analysis and/or measurements collected from inline switch device 10. Next, $I_{LIM1}$ is gradually lowered on a prorated basis so that the current provided just exceeds the PD current demand. The value of the PD current demand may be generated from the estimated power demand for inline switch device 10 and/or using a measured value for $V_{PD}$ ($I_{PD}=P_{PD}/V_{PD}$). One of the output voltages of the DC-DC converter 90(1) is monitored for a voltage drop. The monitored voltage drop may be generally, for example, about 0.1 to 10%, although larger voltage drops are also within the scope of this disclosure. The $V_{OUT}$ (e.g., VEE or VSS in FIG. 2) is checked with an ADC (not shown in FIG. 2) or by a PD voltage threshold detector (also not shown in FIG. 2). The threshold detector and additional ADC may be the same or different circuits. In one example, the ADC is attached to one or more of the output signal line(s) limited by the DC-DC converter. The ADC is also connected to the MCU 100 and may be part of, or separate from, PD subsystem 60(1).

In certain circumstances, the output voltage (e.g., VEE or VSS in FIG. 2) of the DC-DC converts are monitored using threshold detection and compared to a digital-to-analog voltage that is set to a value of a predetermined desired monitored voltage drop. When the monitored voltage drops below the digital-to-analog voltage, a comparator can trigger MCU 100 to stop lowering the $I_{LIM}$. The voltage drop indicates that both PD subsystems 60(1) and 60(2) are entering the current limit state. Further increasing PD load will result in a rapid drop of the DC-DC converter output voltage.

Next, the $I_{LIm}$ for the uncharacterized channel ($I_{LIM2}$ for PD subsystem 60(2)) is reduced. The current for PD subsystem 60(2) remains above $I_{LIM2-MIN}$, which is the $I_{LIM2}$ level at which inline system device 10 will no longer operate properly.

Alternatively, the entry into system current limit may be determined by monitoring PD subsystem 60(2) for a voltage increase, and monitoring PD subsystem 60(1) for a voltage that remains the same or decreases (i.e., both PD input voltages are checked to confirm the inline switch device 10 has entered current limit). The voltage on PD subsystem 60(1) may decrease because some of the load burden shifts to it when $I_{LIM2}$ is decreased. $V_{PD1}$ may remain constant if PD subsystem 60(1) is already in current limit. If $V_{PD2}$ increases and $V_{PD1}$ remains the same, the system has entered current limit. If $V_{PD2}$ increases and $V_{PD1}$ decreases, the system decreases $I_{LIM2}$ further (measurable $V_{PD2}$ change) so that $V_{PD2}$ increases and $V_{PD1}$ remains approximately the same. $I_{LIM2}$ is incrementally decreased until this condition is met, thereby indicating that inline switch device 10 has entered current limit.

A ΔP is transferred from PD subsystem 60(1) to PD subsystem 60(2), thereby resulting in a current and voltages change at PD subsystem 60(2). The ratio of the change in voltage to the change in current produces the PD subsystem 60(2) $R_{CHAN}$.

When inline switch device 10 enters the current limit, the input voltage of PD subsystem 60(2) is recorded. This voltage is referred to as $V_{PD2-1}$ (the input voltage of PD subsystem 60(2) at a first point). Next, the power supplied by PD subsystem 60(2) to the load is increased by ΔP, while the power supplied by PD subsystem 60(1) to the load is decreased by ΔP. As noted above, this ΔP may be translated into a ΔI used to change $I_{LIM}$. $I_{LIM1}$ is slowly reduced and the input voltages of one or both PD subsystem 60(1) and 60(2) are monitored for a voltage increase that, as noted above, indicates that inline switch device 10 is entering current limit. It should be appreciated that $I_{LIM2}$ may also be reduced to accomplish this, but changing $I_{LIM1}$ may be more helpful in determining a minimum ΔI for PD subsystem 60(2).

When inline switch device 10 enters the current limit, the input voltage of PD subsystem 60(2) is recorded. This voltage is referred to as $V_{PD2-2}$ (the input voltage of PD subsystem 60(2) at a second point). The $R_{CHAN}$ for PD subsystem 60(2) is estimated using Equation (9), shown below.

$$R_{chan} = \frac{V_{PD2-2} - V_{PD2-1}}{\Delta I} \quad \text{Equation (9)}$$

Where $\Delta I$ is the $\Delta I$ determined for PD subsystem 60(2).

The value of $V_{PSE}$ for inline power source 35(2) driving PD subsystem 60(2) may be estimated using one of Equations (10) or (11) shown below.

$$V_{PSE} = V_{PD2-1} + R_{chan}I_{PD2-1} \quad \text{Equation (10)}$$

$$V_{PSE} = V_{PD2-2} + R_{chan}I_{PD2-2} \quad \text{Equation (11)}$$

As such, this provides characterization of the channel for PD subsystem 60(2) (i.e., between PD subsystem 60(2) and inline power source 35(2)).

System tolerances are taken into account by using the lower value bound for $R_{CHAN}$ and the upper value bound for $V_{PSE}$. This approach reduces the power provided in the inline switch device 10. The system designer may adjust the power budget of inline switch device 10 to take this into consideration.

In certain circumstances, the above steps may produce no detectable $V_{PD}$ voltage increase by the time the current limit is reached. This may occur in instances in which $R_{CHAN}$ has a value than so low that it cannot be resolved by ADC 80(1). In these circumstances, a default minimum $R_{CHAN}$ may be used that is expected to be lower than the actual $R_{CHAN}$. The voltage $V_{PSE}$ is estimated using the default minimum $R_{CHAN}$ and is adjusted so that the $V_{PSE}$ value is expected to be slightly higher than the real $V_{PSE}$. These estimates reduce the power provided in the inline switch device 10. The system designer may adjust the power budget of inline switch device 10 to take this into consideration.

As noted above, in certain techniques $V_{OUT}$ (e.g., VEE or VSS) may be used to characterize the operation of PD subsystem 60(1), but such techniques use an additional ADC system or threshold detector. Such implementations have the advantage that the working range of $R_{CHAN}$ does not affect such operations.

The above techniques have been primarily described above with reference to a system including two PD subsystems. It should be appreciated that the above technique may also be implemented in a system including additional PD subsystems. In such circumstances, the techniques are generally the same as described above in which one PD subsystem is fully characterized and the system is moved to the current limit entry point so that power may be moved from a characterized PD subsystem to an uncharacterized PD subsystem.

In other circumstances, PD subsystem 60(1) and PD subsystem 60(2) are powered on at the same time. In this scenario, inline switch device 10 powers up into the low power state $P_{PD1}$ (PD power state 1). The power that each PD subsystem 60(1) and 60(2) draws is normally less than $P_{PD1}$. The system is characterized to determine the power level provided by each PD subsystem.

To perform this characterization, the voltage at each PD input is measured. Because the switch is in the lower power state $P_{PD1}$ (<5 W), the voltage measured at each PD input is approximately the voltage of the attached inline power sources 35(1) and 35(2), respectively. Next, one PD subsystem is moved into the default worst-case $I_{LIM}$ level, while the other PD subsystem is left at a lower $I_{LIM}$ level. For this example, assume PD subsystem 60(1) uses the default, worst-case $I_{LIM}$ value from FIG. 5.

Inline switch device 10 is then moved to a higher power level $P_{PD2}$. At this stage, $I_{LIM1}$ of PD subsystem 60(1) is gradually reduced until the output of DC-DC converter 90(1) output drops (decreases) 1-10%. The $V_{PD}$ for PD subsystem 60(1) is then recorded as the second voltage point for PD subsystem 60(1). Next, $I_{LIM2}$ of PD subsystem 60(2) is set to the default worst-case $I_{LIM}$ value and $I_{LIM1}$ of PD subsystem 60(1) is set to the lower $I_{LIM}$ value. The above steps of gradual reduction and recordation are repeated to establish the second voltage point for PD subsystem 60(2). The method as detailed above with reference to FIG. 7 may then be used to complete the channel characterization for both PD subsystems 60(1) and 60(2). $I_{LIM1}$ and $I_{LIM2}$ may then be set to the level that results in the transfer of a desired amount of power.

In still another scenario, PD subsystem 60(1), PD subsystem 60(2), and AUX subsystem 140 are all powered. In this scenario, the default worst-case $I_{LIM1}$ values for PD subsystems 60(1) and 60(2) are used until the AUX supply has been removed. At that time, channel characterization may be completed as described above.

Figure 9:
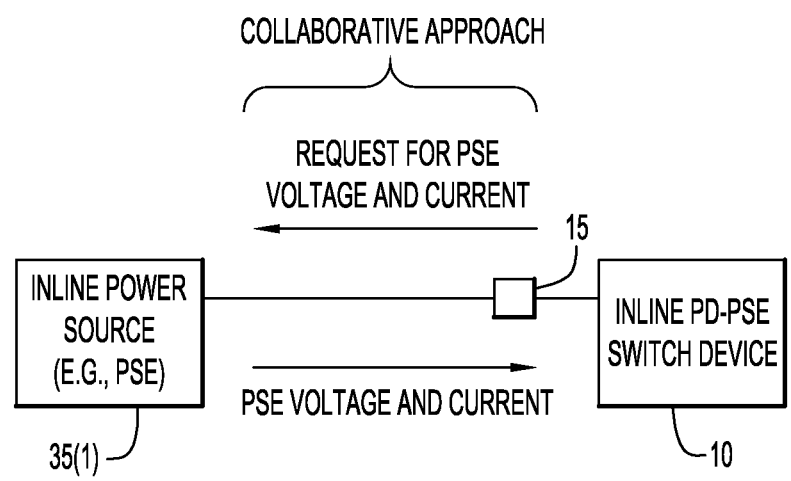
FIG. 9 is a block diagram illustrating a technique for transferring a desired amount of power from the one or more inline power sources to the one or more powered devices using a collaborative scheme involving the inline power source and the inline switch device.

FIG. 9 is a schematic diagram illustrating a collaborative approach in which $I_{LIM}$ is calculated using information determined at inline switch device 10 and information determined at inline power source 35(1). In this scenario, messages generated in accordance with a predetermined protocol are used to facilitate the transfer of information between inline power source 35(1) and PD subsystem 60(1). According to this example, protocol messages are created by adding a Type Length Value (TLV) element to an existing protocol such as, for example, the Cisco Discovery Protocol (CDP) or the Layer Link Discovery Protocol (LLDP), or by using suitable fields in messages according to a new protocol of any type suitable for a particular inline power application.

The collaborative approach using the added TLV element first includes PD subsystem 60(1) sending a message having an integer version of its voltage $V_{PD}$ in a TLV element to inline power source 35(1). For example, a 16-bit TLV field, VPDcode, may be used to convey the PD voltage. In one example, $V_{PD}$=0.001 VPDcode volts, thus a VPDcode of 53200 decimal represents 53.2 V. This integer version of $V_{PD}$ sent to inline power source 35(1) can be seen as a request by PD subsystem 60(1) for the voltage and current of inline power source 35(1) ($V_{PSE}$).

Inline power source 35(1) is capable of responding to this message received from PD subsystem 60(1) and to provide codes that represent $V_{PSE}$ and current provided ($I_{PD1}$). For example, a 16-bit TLV fields, VPSEcode, and IPDcode may be used. In one example, $V_{PSE}$=0.001 VPSEcode volts and $I_{PD1}$=0.0001 IPDcode amps. Thus a VPSEcode of 53200 decimal represents 53.2 V, while an IPDcode of 2500 decimal represents 0.250 A.

In a system with a suitably capable PD subsystem 60(1) and inline power source 35(1), the values $V_{PD}$, $V_{PSE}$, and $I_{PD}$ are exchanged. Therefore, both devices are aware that the attached device supports the new protocol using TLV elements. With this information the inline power source 35(1), and possibly the PD subsystem 60(1), calculate the channel resistance ($R_{CHAN}$) using Equation (12), below.

$$R_{chan} = \frac{V_{PSE} - V_{PD}}{I_{PD}} \quad \text{Equation (12)}$$

The calculated $R_{CHAN}$ is included within the new PSE TLV. For example, an 8-bit RCHANcode may be used. In one example, $R_{CHAN}$=0.1 RCHANcode ohms, thus RCHANcode 105 decimal represents 10.5 ohms.

PD subsystem 60(1), after receiving the new PSE TLV, responds with a handshake confirming that the PD power was constant during the period from when PD subsystem 60(1) issued the $V_{PD}$ TLV to when the PD subsystem 60(1) received the PSE TLV. This process confirms that the calculated value for $R_{CHAN}$ is valid. The handshake may involve populating a field with a reply TLV. This field may be a single bit or multiple bits. As an example, a bit-field in the new PD TLV could be called DONE. When this DONE bit is asserted, the handshake is confirmed. The exchange is started when the TLV is sent with VPDcode and DONE is de-asserted.

If the PD power was not constant throughout the exchange period, the PD subsystem 60(1) ignores the PSE TLV and reissues the PD TLV as explained above. This restarts the PSE measurement and $R_{CHAN}$ calculation.

If $I_{LIM}$ is determined as described above with reference to FIG. 5, $P_{PD}$ may be reduced to take the system tolerance into account so that PD load changes do not cause an IEEE channel current violation. Alternatively, the calculated $L_{LIM}$ may be adjusted upward to take-into-account system tolerance. This approach ensures that PD subsystem 60(1) gets the power it uses for operation, but may lead to brief power transients during large PD load changes.

Additionally, when $V_{PSE}$ changes, the calculated $I_{LIM}$ may change. An inline power source 35(1) with a significant $V_{PSE}$ change may affect the PD subsystem 60(1) $I_{LIM}$ in a way that will cause the inline power source to limit its output power. In such situations, the measurements for the $R_{CHAN}$ calculation are restarted by sending the new TLV ($V_{PSE}$, $I_{PD}$, $R_{CHAN}$). The PD responds to this by sending its new PD TLV. In other words, the inline power source 35(1) will restart the parameter exchange when $V_{PSE}$ changes may affect system operation.

In certain circumstances, some allocated system channel power may be recovered when the PD subsystem 60(1) and inline power source 35(1) do not consume the worst-case IEEE channel loss. This power may be recovered by the inline power source 35(1) or the PD subsystem 60(1). The ownership of this power is controlled by the inline power source 35(1). A standard IEEE mechanism may be used to convey power or the full PD-request-power field is used to convey power. This permits power in excess of the IEEE standard to be transferred (all field 16 bits are used). Alternatively a new TLV may be used rather than extending the IEEE power value. It is noted that more than the IEEE power transfer is possible when $V_{PSE}$ is higher than the IEEE minimum, when the $R_{CHAN}$ is less than the IEEE maximum, or when both cases are true.

In certain circumstances, the PD subsystem 60(1) requests power and the inline power source 35(1) grants what is allowed to be provided. However, a PD's request for power does not include channel power loss. The inline power source is responsible for providing the PD power when channel power loss is taken into account. For example, the PD subsystem 60(1) and inline power source 35(1) use the new TLV element exchange to set an $I_{LIM1}$ that result in the transfer of the desired amount of power through PD subsystem 60(1). The PD subsystem 60(1) sets $I_{LIM1}$ and then determines what power may be recovered. The IEEE standards set forth PSE minimum power requirements and PD maximum load power. In most cases, inline power sources provide more than the IEEE requirement and these devices do not recover the channel excess power allocation.

To keep cable current levels within the IEEE standards and within cable standard maximum allowances, a previously used formula may be mathematically manipulated as shown in Equation (13), below.

$$P_{PD} = \frac{V_{PSE}^2 - (V_{PSE} - I_{PD_{cable}} 2R_{chan})^2}{4R_{chan}} \quad \text{Equation (13)}$$

where $I_{PDcable}$ is the current cable limit according to the IEEE standard.

It is noted that this process calculates the maximum power that may be transferred to the PD without exceeding the cable maximum current limit. As shown in Equation (10), this power includes channel power normally allocated, but not used. For example, a Type-2 PD may draw 25.5 W and a Type-2 PSE normally provides at least 30 W. This system uses at least a Class-D cable which has a current limit of 0.6 A. If $R_{CHAN}$ is half of the worst-case value which results in a channel resistance of 6.25 ohms, and $V_{PSE}$ is 53 V, then the maximum average PD power, $P_{PD}$, is calculated to be 29.6 W.

In certain circumstances, a PD subsystem may receive power via a 4-pair powering connection over a single cable. In such examples, the $I_{LIM}$ calculated for one pair of wires may be duplicated for the other pair because both pairs may be assumed to be driven by a inline power source using the same supply voltage $V_{PSE}$ and each alternative has a comparable $R_{CHAN}$ (within cable resistance matching tolerance).

In certain circumstances, the $P_{PD}$ may be estimated as described below. More specifically, $V_{PD}$ is given as below in Equation (14).

$$V_{PSE} - R_{chan}I_{PD} = V_{PD} \quad \text{Equation (14)}$$

The values for all parameters except $I_{PD}$ are known from the methods covered above. This equation may then be manipulated mathematically to produce Equation (15), below.

$$\frac{V_{PSE} - V_{PD}}{R_{chan}} = I_{PD} \quad \text{Equation (15)}$$

The PD power, $P_{PD}$, is then as provided below in Equation (16)

$$V_{PD}\frac{V_{PSE} - V_{PD}}{R_{chan}} = V_{PD}I_{PD} = P_{PD} \quad \text{Equation (16)}$$

The examples described above are primarily with reference to a PD-PSE switch device. It is to be appreciated that aspects described herein may be implemented in a PD, or other types of PD-PSE devices. Aspects described herein may also have one or more advantages. For example, in certain circumstances, the PD power consumption may be measured for use in energy efficiency monitoring. In another example, aspects allow the detection of an inline power source powering the PD subsystem. Detecting removal of the inline power source may be used to trigger load shedding. In still another example, supply drop detection is facilitated. Detection of a drooping supply rail exposes excess system power demands and may be used to trigger a load reduction or other corrective action that restores normal system operation.

Certain techniques described above use measurements of the voltages (e.g., VSS or VEE) at the output of the DC-DC converters. The DC-DC converts may cause noise in the form of small pulses that are above or below the average power. A low pass filter may be provided between the DC-DC converts and the ADCs to remove high frequency components so as to prevent aliasing in the frequency domain when sampled data systems are used.

Certain techniques described above use measured voltages to determined the current for a PD subsystem, while other above described techniques allow for the direct or indirect measurement of current in a PD subsystem. It should be appreciated that the various techniques are not mutually exclusive, but rather may be combined in various different manners. For example, the current measurement may be substituted for current determination in one or more of the above techniques.

The above description is intended by way of example only. What is claimed is:

1. A method comprising:
    drawing power from first and second inline power sources at first and second powered device subsystems, respectively, in a switch device, wherein a portion of the power is to be consumed by the first and second powered device subsystems;
    collectively transferring, by the first and second powered device subsystems, a portion of the power that is not consumed to one or more powered devices;
    determining first and second limits for the current drawn by the first and second powered device subsystems, respectively, during transfer of power by the first and second powered device subsystems to the one or more powered devices that results in the transfer of a selected amount of power to the one or more powered devices;
    adjusting the limit for the current drawn by the first and second powered device subsystems to the determined first and second limits; and
    wherein the selected amount of power transferred by each of the first and second powered device subsystems is such that each powered device subsystem transfers an amount of power that is pro-rated based on its relative power delivery capability.

2. The method of claim 1, wherein determining comprises:
    determining the first and second limits for current drawn that results in the transfer of a maximum amount of power to the one or more powered devices that does not violate one or more predetermined requirements.

3. The method of claim 1, wherein determining comprises:
    determining the first and second limits for current drawn that results in the transfer of the selected amount of power to the one or more powered devices while ensuring that the level of current drawn from the inline power sources remains below a predetermined level.

4. The method of claim 1, wherein determining comprises:
    identifying different worst-case operating conditions for the first and second inline power sources and the first and second powered device subsystems;
    iteratively calculating levels of current drawn by the first and second powered device subsystems using different combinations of the worst-case operating conditions; and
    selecting one of the calculated levels of current drawn that results in the transfer of the selected amount of power by the first and second powered device subsystems.

5. The method of claim 1, wherein the first inline power source is connected to the first powered device subsystem by a channel, and wherein determining comprises:
    obtaining a predetermined resistance of the channel connecting the first inline power source to the first powered device subsystem; and
    estimating a voltage generated at the first inline power source; and
    calculating, based on the estimated voltage generated at the first inline power source and the predetermined resistance, a level of current drawn by the first powered device subsystem that results in the transfer of the selected amount of power by the first powered device subsystem.

6. The method of claim 1, wherein the first inline power source is connected to the first powered device system by a channel, and wherein determining comprises:
    estimating a resistance of the channel connecting the first inline power source to the first powered device subsystem;
    estimating a voltage generated at the first inline power source; and
    calculating, based on the estimated voltage generated at the first inline power source the estimated resistance, a level of current drawn by the first powered device subsystem that results in the transfer of the selected amount of power by the first powered device subsystem.

7. The method of claim 6, further comprising:
    measuring an input voltage of the first powered device subsystem;
    using the measured input voltage to estimate resistance of the channel connecting the first inline power source to the first powered device subsystem; and
    using the estimated resistance of the channel connecting the first inline power source to the first powered device subsystem to estimate the voltage generated at the first inline power source.

8. The method of claim 6, further comprising:
    measuring a current of the first powered device subsystem;
    measuring an input voltage of first powered device subsystem;
    using the measured input voltage and current of the first powered device subsystem to estimate resistance of the channel connecting the first inline power source to the first powered device subsystem; and
    using the estimated resistance of the channel connecting the first inline power source to the first powered device subsystem to estimate the voltage generated at the first inline power source.

9. The method of claim 1, wherein the first inline power source is connected to the first powered device subsystem by a channel, and wherein determining comprises:
    determining a change in a voltage of the first powered device subsystem; and
    determining a dynamic resistance of the channel connecting the first inline power source to the first powered device subsystem.

10. The method of claim 1, wherein the first powered device subsystem includes a direct current-to-direct current (DC-DC) converter for transfer of power to the one or more powered devices, and further comprising:
    monitoring a decrease in an output voltage of the DC-DC to determine when the current in the first powered device subsystem approaches the determined limit.

11. The method of claim 1, wherein determining comprises:
    requesting information from the first inline power source;
    receiving the requested information; and
    using the received information to determine the limit for the current drawn by the first powered device subsystem.

12. The method of claim 11, wherein requesting the information comprises:
    sending a message according to a predetermined protocol that includes a Type Length Value (TLV) element.

13. The method of claim 12, wherein receiving the requested information comprises:
receiving a message according to the predetermined protocol from the first inline power source that includes a TLV element indicating the voltage of the first inline power source and the current provided to the first powered device subsystem.

14. The method of claim 1, wherein the first and second powered device subsystems are components of an inline switch device including a microcontroller unit and a processor, and further comprising:
performing a handshake between the microcontroller and the processor to indicate when the first and second powered device subsystems are permitted to move from a first power state to a second power state.

15. An apparatus comprising:
one or more uplink ports configured to be connected to an inline power source;
one or more output ports configured to be connected to one or more powered devices;
a powered device subsystem configured to draw power from the inline power source via an uplink port and to transfer a portion of the power that is not consumed to the one or more powered devices; and
a controller configured to determine a limit for the current drawn by the powered device subsystem during transfer of power by the powered device subsystem to the one or more powered devices that results in the transfer of a selected amount of power to the one or more powered devices, and to adjust the limit for the current drawn by the powered device subsystem to the determined limit;
wherein the powered device subsystem includes a direct current-to-direct current (DC-DC) converter configured to transfer power to the one or more powered devices and to draw current from the inline power source, and wherein the controller is configured to adjust the limit of the DC-DC converter.

16. The apparatus of claim 15, wherein the DC-DC converter comprises a current sense module configured to provide an estimate of the current in the powered device subsystem.

17. The apparatus of claim 16, wherein the current sense module comprises:
a sense resistor;
an amplifier connected to the sense resistor; and
a low-pass filter connected to the output of the amplifier.

18. The apparatus of claim 15, wherein the controller is configured to determine the limit that results in the transfer of a maximum amount of power to the one or more powered devices and that does not violate one or more predetermined requirements.

19. The apparatus of claim 15, wherein the powered device subsystem comprises first and second powered device subsystems configured to draw power from first and second inline power sources, respectively, and to collectively transfer power to the one or more powered devices.

20. The apparatus of claim 19, wherein the controller is configured to determine first and second limits for the transfer of power by each of the first and second powered device subsystems, respectively, to the one or more powered devices that results in the selected amount of power transferred by each of the first and second powered device subsystems.

21. The apparatus of claim 20, wherein the controller is configured to select the selected amount of power transferred by each of the first and second powered device subsystems so that each powered device subsystem transfers an amount of power that is pro-rated based on its relative power delivery capability.

22. The apparatus of claim 15, wherein the controller is configured to determine the limit that results in the transfer of the selected amount of power to the one or more powered devices while ensuring that the level of the current drawn from the inline power source remains below a predetermined level.

23. The apparatus of claim 15, wherein the controller is configured to identify different worst-case operating conditions for the inline power source and powered device subsystem, iteratively calculate levels of current drawn by the powered device subsystem using different combinations of the worst-case operating conditions, and select one of the calculated levels of current drawn that results in the transfer of the selected amount power by the powered device subsystem.

24. The apparatus of claim 15, wherein the powered device subsystem is connected to the inline power source by an Ethernet channel, and wherein the controller is configured to estimate a voltage generated at the inline power source, obtain a predetermined resistance of the Ethernet channel connecting the inline power source to the powered device subsystem, and calculate, based on the estimated voltage generated at the inline power source and the predetermined resistance, the level of current drawn by the powered device subsystem that results in the transfer of the selected amount of power by the powered device subsystem.

25. The apparatus of claim 15, wherein the powered device subsystem is configured to connect to the inline power source by an Ethernet channel, and wherein the controller is configured to estimate a voltage generated at the inline power source, estimate a resistance of the Ethernet channel connecting the inline power source to the powered device subsystem, and calculate, based on the estimated voltage generated at the inline power source the estimated resistance, the level of current drawn by the powered device subsystem that results in the transfer of the selected amount power by the powered device subsystem.

26. The apparatus of claim 25, further comprising:
an analog-to-digital converter (ADC) configured to measure an input voltage of powered device subsystem, and wherein the controller is configured to use the measured input voltage to estimate resistance of the channel connecting the inline power source to the powered device subsystem, and use the estimated resistance of the channel connecting the inline power source to the powered device subsystem to estimate the voltage generated at the inline power source.

27. The apparatus of claim 25, wherein the DC-DC converter is configured to measure a current of the powered device subsystem, and further comprising:
an analog-to-digital converter (ADC) configured to measure an input voltage of powered device subsystem, and wherein the controller is configured to use the measured input voltage and current of the powered device subsystem to estimate resistance of the channel connecting the inline power source to the powered device subsystem, and use the estimated resistance of the channel to estimate the voltage generated at the inline power source.

28. The apparatus of claim 15, wherein the powered device subsystem is connected to the inline power source by an Ethernet channel, and wherein the controller is configured to determine the change in a voltage of the powered device subsystem, and determine a dynamic resistance of the Ethernet channel connecting the inline power source to the powered device subsystem.

29. The apparatus of claim 15, wherein the controller is configured to request information from the inline power source, receive the requested information, and use the received information to determine the limit for the transfer of power by the powered device subsystem.

30. The apparatus of claim 29, wherein the controller is configured to request the information by sending a message according to a predetermined protocol that includes a Type Length Value (TLV) element.

31. The apparatus of claim 15, wherein the controller comprises:
   a microcontroller unit (MCU); and
   a processor that is separate from the MCU.

32. A method comprising:
   drawing power from first and second inline power sources at first and second powered device subsystems in a switch device, wherein a portion of the power is to be consumed by the first and second powered device subsystems;
   collectively transferring, by the first and second powered device subsystems, a portion of the power that is not consumed to one or more powered devices; and
   balancing the power transferred to the one or more powered devices between the first and second powered device subsystems based on the power delivery capabilities of each of the first and second powered device subsystems.

33. The method of claim 32, comprising:
   determining limits for the current drawn by the first and second powered device subsystems during transfer of power to the one or more powered devices that result in the transfer of a selected amount of power to the one or more powered devices, and
   adjusting the limit for the current drawn by the first and second powered device subsystems to the determined limits.

34. The method of claim 33, wherein determining comprises:
   determining limits for current drawn that results in the transfer of a maximum amount of power to the one or more powered devices that does not violate one or more predetermined requirements.

35. The method of claim 32, wherein the first and second powered device subsystems each include a direct current-to-direct current (DC-DC) converter for transfer of power to the one or more powered devices, and further comprising:
   adjusting a current limit of the DC-DC converters.

* * * * *